(12) United States Patent
Saikia

(10) Patent No.: US 8,553,954 B2
(45) Date of Patent: Oct. 8, 2013

(54) AUTOMATED SYSTEM FOR ANATOMICAL VESSEL CHARACTERISTIC DETERMINATION

(75) Inventor: Hrishikesh Saikia, Bangalore (IN)

(73) Assignee: Siemens Medical Solutions USA, Inc., Malvern, PA (US)

( * ) Notice: Subject to any disclaimer, the term of this patent is extended or adjusted under 35 U.S.C. 154(b) by 360 days.

(21) Appl. No.: 12/861,964

(22) Filed: Aug. 24, 2010

(65) Prior Publication Data

US 2012/0051606 A1   Mar. 1, 2012

(51) Int. Cl.
| | |
|---|---|
| G06K 9/00 | (2006.01) |
| G06K 9/48 | (2006.01) |
| G06K 9/20 | (2006.01) |
| G06K 9/36 | (2006.01) |
| G06K 9/40 | (2006.01) |
| A61B 5/02 | (2006.01) |
| G06T 17/00 | (2006.01) |

(52) U.S. Cl.
USPC ........... 382/128; 382/162; 382/168; 382/199; 382/274; 382/282; 600/481; 345/420

(58) Field of Classification Search
USPC ......... 382/100, 128–132, 162, 168–169, 181, 382/190, 195, 254, 256–258, 266–268, 274, 382/282–283, 286, 305; 600/300, 407–480, 600/481, 500–504; 345/420
See application file for complete search history.

(56) References Cited

U.S. PATENT DOCUMENTS

| | | | |
|---|---|---|---|
| 5,935,076 A | | 8/1999 | Smith |
| 6,817,982 B2 * | | 11/2004 | Fritz et al. ...................... 600/443 |
| 7,778,686 B2 * | | 8/2010 | Vass et al. ....................... 600/424 |
| 2001/0027272 A1 * | 10/2001 | Saito et al. ..................... 600/426 |
| 2002/0118869 A1 * | 8/2002 | Knoplioch et al. ............ 382/131 |
| 2002/0176614 A1 * | 11/2002 | Kuth et al. ..................... 382/128 |
| 2004/0082846 A1 * | 4/2004 | Johnson et al. ................ 600/410 |
| 2004/0197015 A1 * | 10/2004 | Fan et al. ....................... 382/128 |
| 2004/0252870 A1 * | 12/2004 | Reeves et al. .................. 382/128 |
| 2006/0147101 A1 * | 7/2006 | Zhang et al. ................... 382/131 |
| 2006/0291742 A1 * | 12/2006 | Zhang et al. ................... 382/266 |

(Continued)

OTHER PUBLICATIONS

Saradhi, G.V.; Balasubramanian, S.; Chandrasekaran, V.; , "Performance Enhancement of Optic Disc Boundary Detection using Active Contours via Improved Homogenization of Optic Disc Region," Information and Automation, 2006. ICIA 2006. International Conference on , vol., no., pp. 264-269, Dec. 15-17, 2006.*

(Continued)

*Primary Examiner* — Randolph I Chu
*Assistant Examiner* — Nathan Bloom
(74) *Attorney, Agent, or Firm* — Peter R. Withstandley

(57) ABSTRACT

A system enables a user to mark a ROI of a vessel portion having detected boundaries and extend the detection of vessel boundaries into a region identified by the user. An anatomical blood vessel detection and display system includes a user interface enabling a user, via a display of an image presenting anatomical vessels, to, mark a region of interest in a vessel identified by detected boundaries in the image and extend the marked region of interest of the vessel. A detector automatically detects a boundary of the vessel in the extended marked region of interest by detecting an edge representing a change in luminance in data representing the image. An image data processor identifies a minimum vessel diameter in the extended marked region of interest between the detected boundaries and initiates identification of the location of the minimum vessel diameter in the image.

22 Claims, 19 Drawing Sheets

(56) References Cited

U.S. PATENT DOCUMENTS

| | | |
|---|---|---|
| 2007/0083099 A1* | 4/2007 | Henderson et al. ............ 600/407 |
| 2007/0116332 A1* | 5/2007 | Cai et al. ........................ 382/128 |
| 2008/0008369 A1* | 1/2008 | Koptenko et al. .............. 382/128 |
| 2009/0060298 A1* | 3/2009 | Weijers et al. ................. 382/128 |
| 2009/0060366 A1* | 3/2009 | Worrell et al. ................. 382/256 |
| 2009/0192647 A1 | 7/2009 | Nishiyama |
| 2010/0142766 A1 | 6/2010 | Fleming |
| 2010/0142767 A1 | 6/2010 | Fleming |
| 2011/0081057 A1* | 4/2011 | Zeng .............................. 382/128 |

OTHER PUBLICATIONS

Sagar, A.V.; Balasubramaniam, S.; Chandrasekaran, V.; , "A Novel Integrated Approach Using Dynamic Thresholding and Edge Detection (IDTED) for Automatic Detection of Exudates in Digital Fundus Retinal Images," Computing: Theory and Applications, 2007. ICCTA '07. International Conference on , vol., no., pp. 705-710, Mar. 5-7, 2007.*

K. Poon et al, "Live-Vessel: Extending Livewire for Simultaneous Extraction of Optimal Medial and Boundary Paths in Vascular Images", Medical Image Computing and Computer-Assisted Intervention ê€ MICCAI 2007 , 10th International Conference, Brisbane, Australia, Oct. 29-Nov. 2, 2007, Proceedings, Part II, pp. 444-451.*

Suzuki, K., Horiba, I., Sugie, N. and Nanki, M., "Computer-aided diagnosis system for coronary artery stenosis using a neural network", Proc. SPIE 4322, 1771-1782 (2001).*

* cited by examiner

S1:Start point

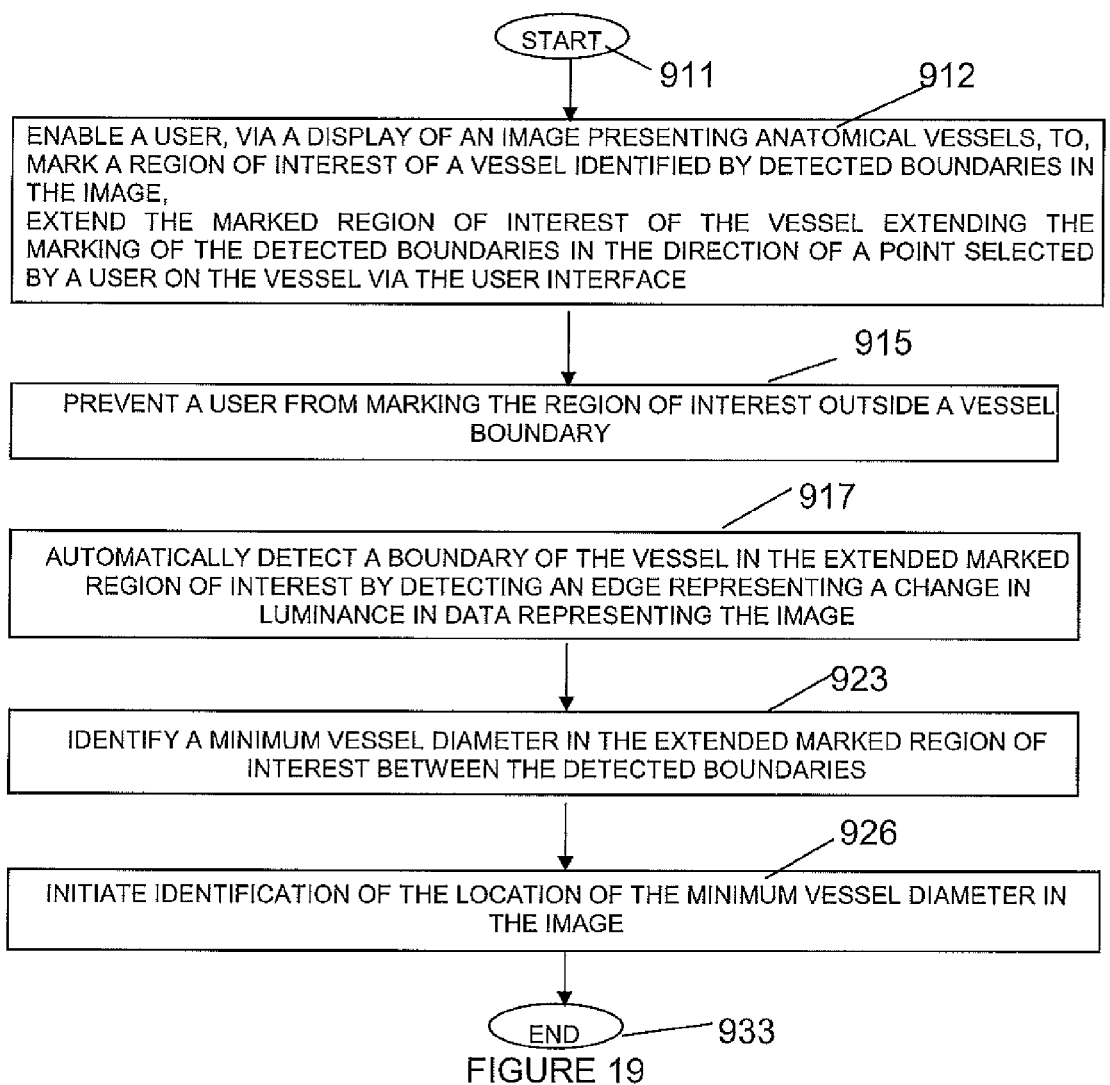

AUTOMATED SYSTEM FOR ANATOMICAL VESSEL CHARACTERISTIC DETERMINATION

FIELD OF THE INVENTION

This invention concerns an anatomical blood vessel detection and display system enabling a user, via a display of an image presenting anatomical vessels, to extend a marked region of interest of a vessel and automatically detect a boundary of the vessel in the extended marked region of interest.

BACKGROUND OF THE INVENTION

In known blood vessel detection applications, blood vessel detection involves multiple user interactions making detection both time consuming and prone to error. Known systems for blood vessel detection experience problems including, erroneous detection of vessel boundaries, excessive use of computation resources, inflexibility. Known systems also often require burdensome iterative trial and error processing. A user of a known system may inadvertently select a region outside of a vessel area resulting in erroneous detection of a non-existent vessel boundary as illustrated in FIG. 1 in the erroneously detected boundary 103 in a region of interest outside of a real vessel boundary. Known systems also lack flexibility in enabling a user to extend an already detected portion of a vessel boundary to a different vessel portion and may require complete image vessel re-detection. Known methods typically do not allow extension of a detected vessel to an undetected portion. Known methods also do not allow a user to extend vessel boundary detection to a side branch of an already detected main vessel branch through a bifurcation, for example.

Known vessel detection methods involve repetitive trial and error steps when smaller diameter vessels have to be detected and a detected vessel boundary may not fit an actual boundary. This results in a user having to correct a detected boundary or delete the boundary in order to manually mark the vessel in the region of interest and initiate vessel detection to match the actual boundary. Further, known methods involve burdensome computation and perform vessel detection each time a user selects a region in the same image. This leads to unnecessary repetitive computation to detect a vessel boundary in the selected region of interest. Known methods also involve multiple manual user interactions to edit a detected vessel to make the vessel detection match with an actual vessel boundary to move detection through a vessel bifurcation, for example. A system according to invention principles addresses these deficiencies and related problems.

SUMMARY OF THE INVENTION

A system enables a user to mark a ROI of a vessel portion having detected boundaries and extend the detection of vessel boundaries into a region identified by the user and inhibit erroneous detection of boundaries in an image area devoid of vessels. An anatomical blood vessel detection and display system includes a user interface enabling a user, via a display of an image presenting anatomical vessels, to, mark a region of interest in a vessel identified by detected boundaries in the image and extend the marked region of interest of the vessel. A detector automatically detects a boundary of the vessel in the extended marked region of interest by detecting an edge representing a change in luminance in data representing the image. An image data processor identifies a minimum vessel diameter in the extended marked region of interest between the detected boundaries and initiates identification of the location of the minimum vessel diameter in the image.

BRIEF DESCRIPTION OF THE DRAWING

FIG. 19 shows a flowchart of a process employed by an anatomical blood vessel detection and display system, according to invention principles.

DETAILED DESCRIPTION OF THE INVENTION

A system enables a user to mark a ROI of a vessel portion having detected boundaries and extend the automatic detection of vessel boundaries into a region identified by the user. The system automatically determines a minimum vessel diameter in the extended marked region of interest between the detected boundaries and initiates identification of the location of the minimum vessel diameter in the image.

Figure 1:
FIG. 1 shows a medical image indicating an erroneously detected vessel boundary in a region of interest outside of an actual vessel boundary.
Figure 2:
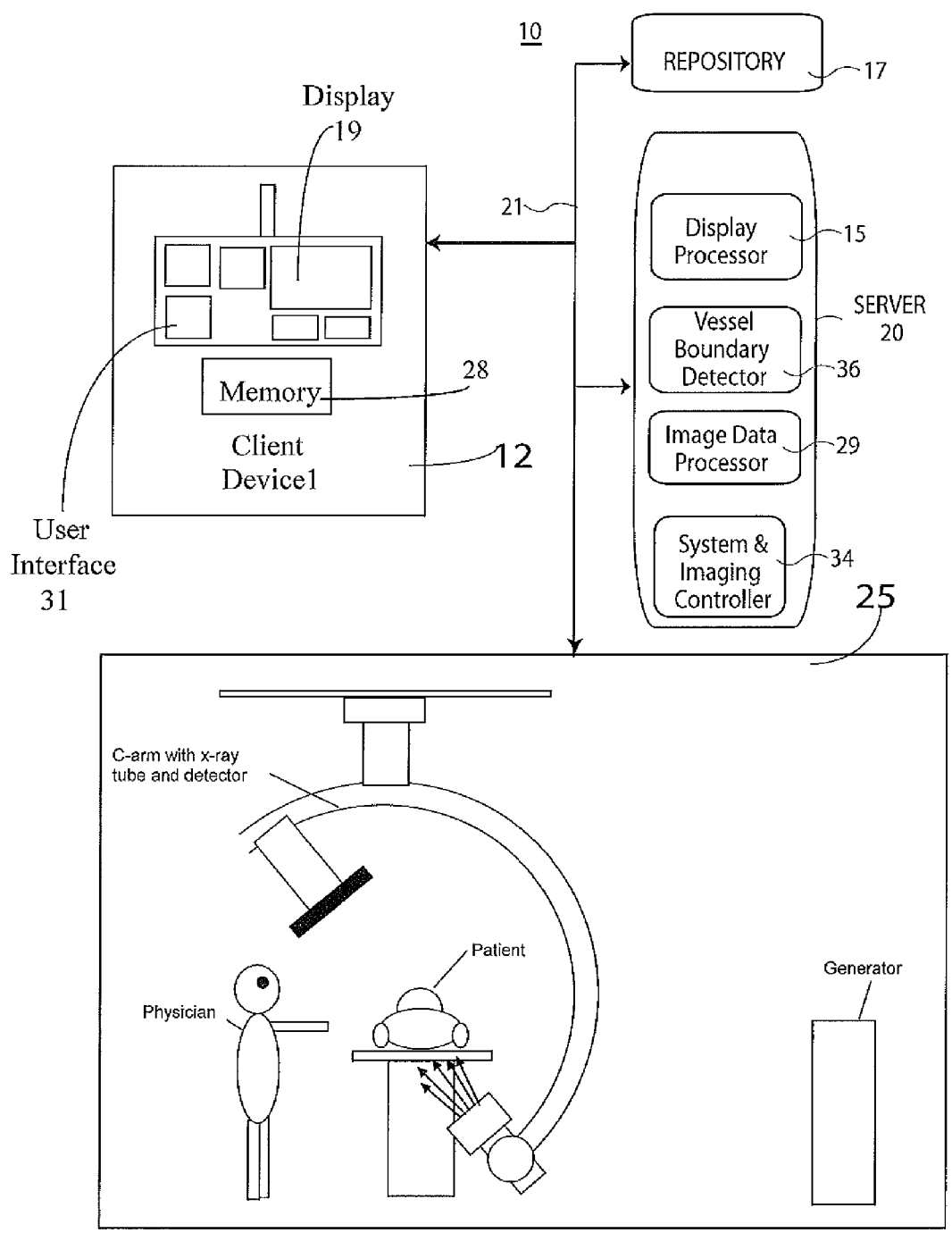
FIG. 2 shows an anatomical blood vessel detection and display system, according to invention principles.

FIG. 2 shows anatomical blood vessel detection and display system 10. System 10 includes one or more processing devices (e.g., workstations or portable devices such as notebooks, computers, Personal Digital Assistants, phones) 12 that individually include a user interface control device 31 such as a keyboard, mouse, touchscreen, voice data entry and interpretation device and memory 28. System 10 also includes at least one repository 17, X-ray imaging modality system 25 (which in an alternative embodiment may comprise an MR (magnetic resonance), CT scan, or Ultra-sound system, for example) and server 20 intercommunicating via network 21. X-ray modality system 25 comprises a C-arm X-ray radiation source and detector device rotating about a patient table and an associated electrical generator for providing electrical power for the X-ray radiation system. The display images are generated in response to predetermined user (e.g., physician) specific preferences. At least one repository 17 stores medical image studies for multiple patients in DICOM compatible (or other) data format. A medical image study individually includes multiple image series of a patient anatomical portion which in turn individually include multiple images. Server 20 includes, display processor 15, image data processor 29, vessel boundary detector 36 and system and imaging controller 34. Display processor 15 provides data representing display images comprising a Graphical User Interface (GUI) for presentation on display 19 of processing device 12. Imaging controller 34 controls operation of imaging device 25 in response to user commands entered via user interface 31. In alternative arrangements, one or more of the units in server 20 may be located in device 12 or in another device connected to network 21.

Imaging system 25 acquires data representing images of vessels of patient anatomy. Display processor 15 enables a user, via a display of an image on unit 19 presenting anatomical vessels, to, mark a region of interest in a vessel identified by detected boundaries in the image and to extend the marked region of interest of the vessel. Vessel boundary detector 36 automatically detects a boundary of the vessel in the extended marked region of interest by detecting an edge representing a change in luminance in data representing the image. Image data processor 29 identifies a minimum vessel diameter in the extended marked region of interest between the detected boundaries and initiates identification of the location of the minimum vessel diameter in the image.

System 10 automatically detects vessel boundaries within a whole image using vessel boundary detector 36. A user employs user interface device 31 FIG. 2 to mark a region of interest (ROI), mark a particular vessel portion and to extend the vessel by automatically detecting a boundary of the vessel in the extended marked region of interest. In extending a vessel, a user marks two points in between highlighted detected vessel boundaries in the detected vessel in the marked ROI of the image. A user marks a ROI on a detected vessel, rather than selecting a ROI from within the image. This advantageously prevents a user from marking a ROI outside a vessel boundary resulting in mismatch of marked and actual vessel and erroneous vessel boundary detection. System 10 enables a user to extend the marked vessel by selecting a center point along with a boundary of the marked ROI vessel. System 10 provides flexibility in extending already detected vessel boundaries, reducing computation time in marking a detected vessel in a ROI and ensuring a marked vessel matches an actual vessel. The system minimises manual user interaction involved in performing deletion of a marked vessel and redrawing a vessel boundary in response to erroneous boundary detection, for example.

A user marks a vessel in a marked ROI and initiates extending the marked vessel boundaries by selecting a region of interest to mark a segment of a vessel in an image that highlights vessels provided by vessel boundary detector 36 in an initial detection operation. A user selects and marks two center points representing start and end point in between a vessel boundary in a marked ROI as illustrated in FIG. 14A. In response to marking the center points, vessel boundary detector 36 finds the nearest boundary points surrounding the start point and tracks and extends the boundary pixels having pixel location and direction determined by detector 36.

Figure 3:
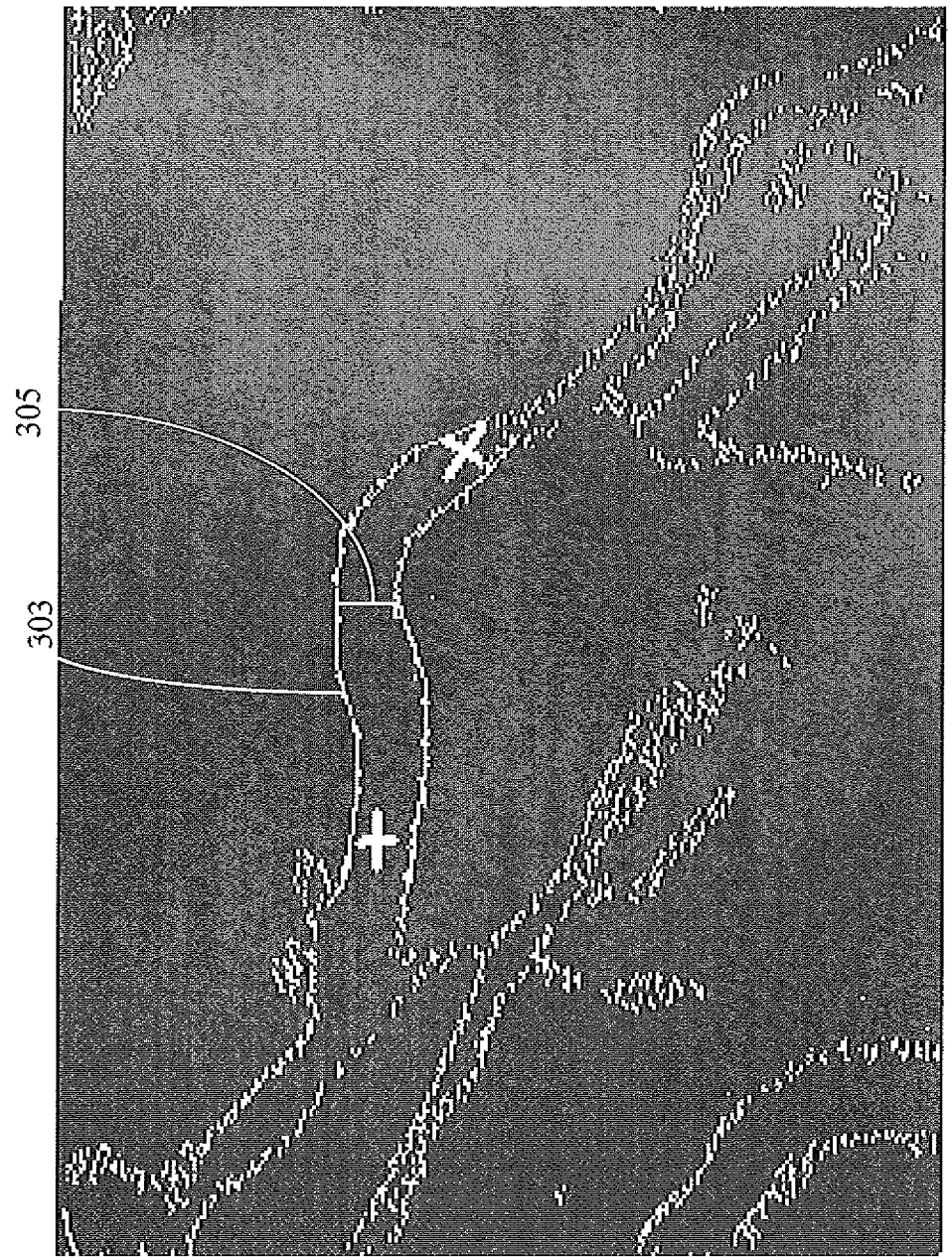
FIG. 3 shows a medical image indicating a portion of a detected vessel boundary and measurement of a minimal luminal diameter (MLD), according to invention principles.
Figure 4:
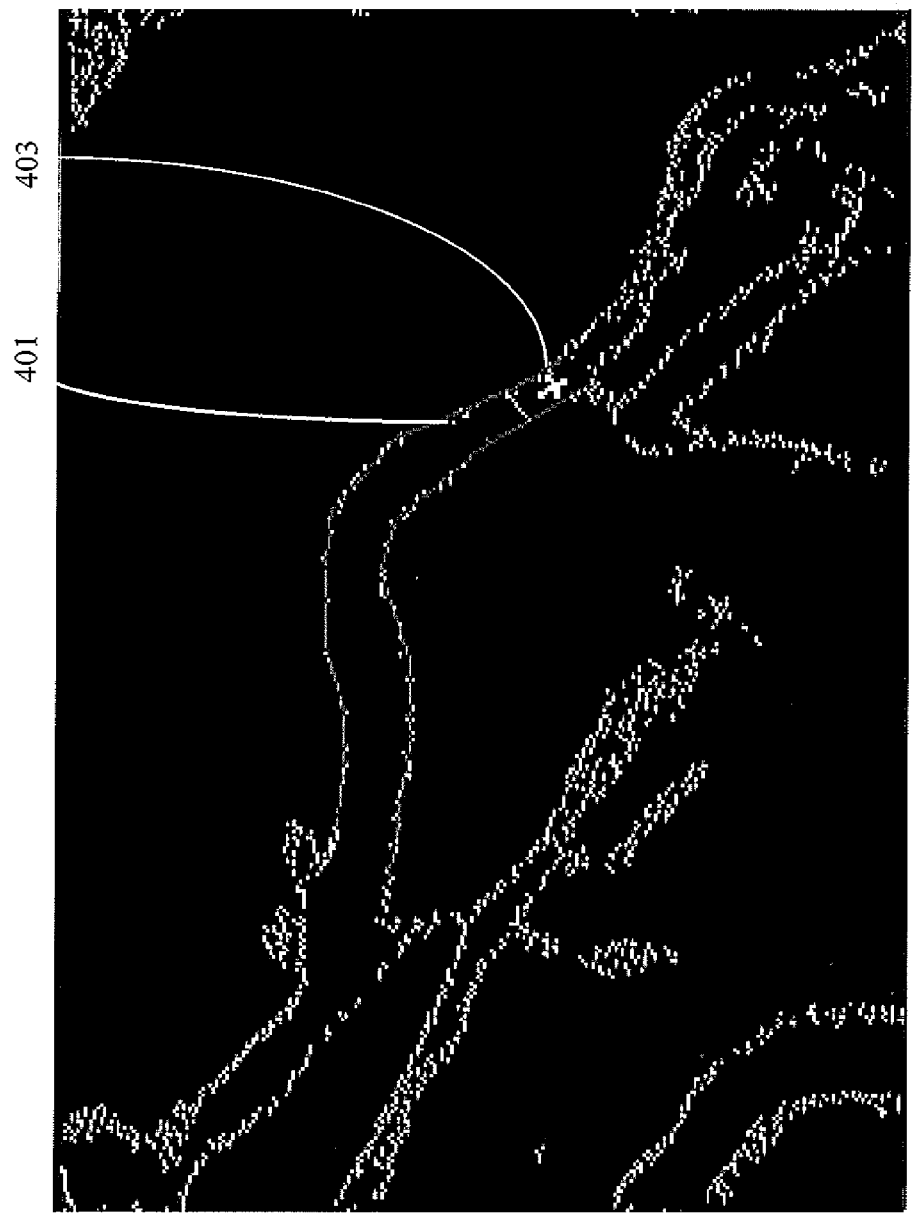
FIG. 4 shows extending detected boundaries of a marked vessel in response to selecting a center point along the marked vessel, according to invention principles.
Figure 5:
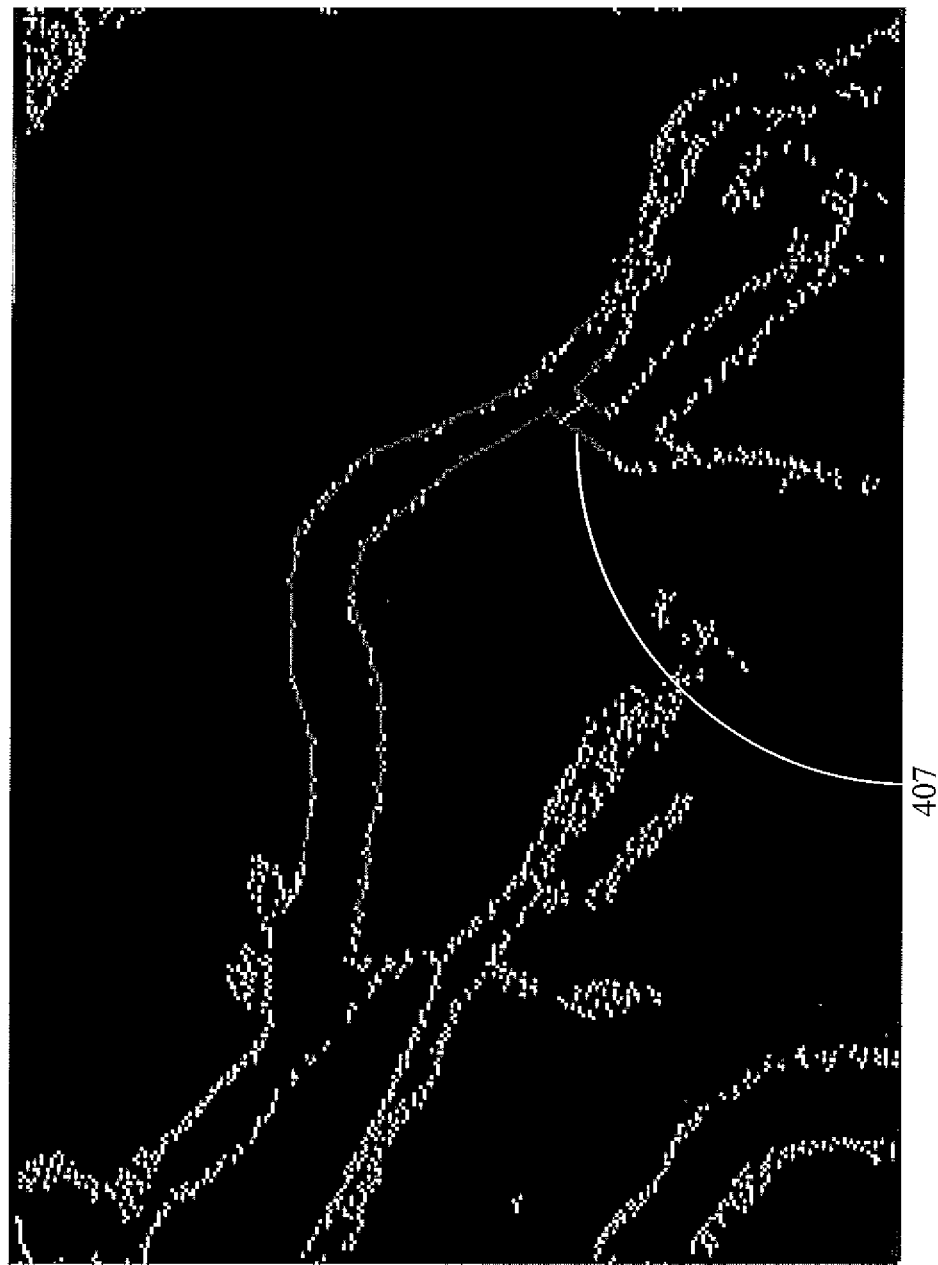
FIG. 5 shows extending detected boundaries of a marked vessel to a side branch, i.e. extending detection from non-bifurcation to bifurcation, according to invention principles.

FIG. 3 shows a medical image indicating a portion of a detected vessel boundary and measurement of a minimal luminal diameter (MLD). Detector 36 tracks and extends the boundary pixels to provide the highlighted vessel portion 303 between the two white crosses in a ROI. Image data processor 29 automatically identifies and measures minimal luminal diameter (MLD) 305. The tracking of boundary pixels in a ROI ends when tracking reaches near the end point marked by the user. Whenever no path is determined by detector 36 between start and end point marked by a user, detector 36 prompts a user via an image on display 19 to remark the ROI. In response to user marking of a vessel boundary in a ROI, a user is advantageously able to extend a marked vessel provided that there is a path or continuity in between the marked vessel and marked center point. Detector 36 employs the tracking process extending boundary pixels in the direction of the vessel until the newly marked center point is reached. FIG. 4 shows extension of detected boundaries 401 of a marked vessel by detector 36 in response to selection of center point 403 along the marked vessel. FIG. 5 shows detector 36 extending detected boundaries of a marked vessel to a side branch 407, i.e. extending detection from non-bifurcation to bifurcation.

Figure 6:
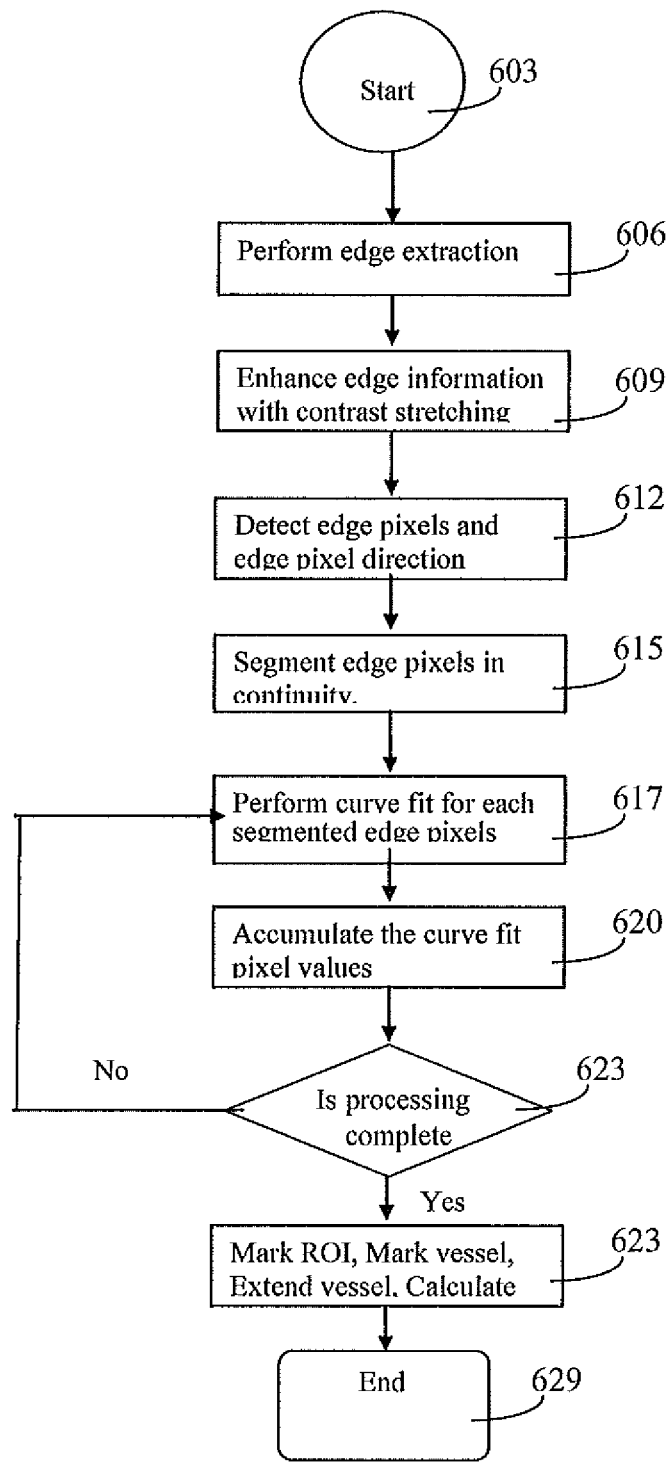
FIG. 6 shows a flowchart of a process used by an anatomical blood vessel detection and display system for extending detection of a vessel boundary and measurement of a minimal luminal diameter (MLD), according to invention principles.

FIG. 6 shows a flowchart of a process used by vessel boundary detector 36 for extending detection of a vessel boundary and measurement of a minimal luminal diameter (MLD). In step 606 following the start at step 603, detector 36 performs edge extraction in a source image by identifying blood vessels as edges comprising discontinuity of image brightness. Detector 36 generates a two dimensional convolution matrix for extracting an edge pixel and performs a two dimensional convolution with the matrix to detects sharp variation of intensity around a pixel. In one embodiment a convolution filter of size 5×5 is applied to a source image to extract the features representing blood vessels in the image. With a filter size 5×5, each pixel intensity is calculated by taking the weighted average of the neighboring pixel intensities, i.e. pixels from two rows from top, bottom and left and right. A convolution filter matrix for edge extraction comprises,

| | | | | |
|---|---|---|---|---|
| −0.125000 | −0.125000 | −0.125000 | −0.125000 | 1.000000 |
| −0.125000 | 1.000000 | −0.125000 | −0.125000 | −0.125000 |
| −0.125000 | −0.125000 | −0.125000 | 0.062500 | 0.125000 |
| 0.125000 | −0.125000 | 0.062500 | 0.125000 | 0.062500 |
| 1.000000 | −0.125000 | 0.125000 | 0.062500 | 0.125000. |

In each row or column of the filter matrix, the filter values are positive or negative. So for pixels which are edge pixels, the weighted average of each pixel tends towards maxima and for the pixels with uniform intensities the weighted average tends towards zero. The filtered pixel luminance values are given by, $$H[x][y] = \sum_{j=0}^{height-1} \sum_{i=0}^{width-1} F[x+i][y+j]G[i][j]$$

Figure 7:
FIG. 7 shows an input vessel image processed by a vessel boundary detection system, according to invention principles.
Figure 8:
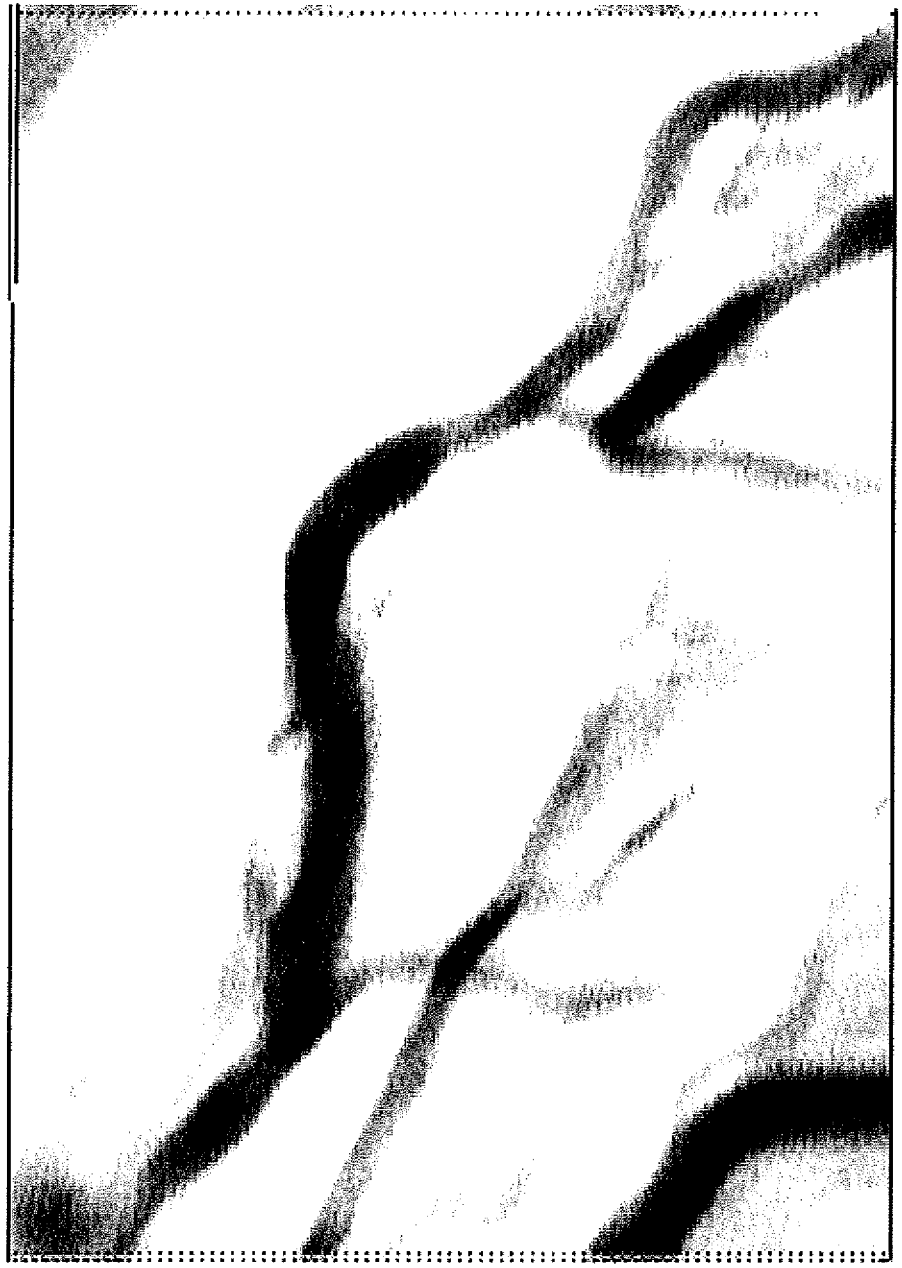
FIG. 8 shows an image provided in response to edge detection performed in the input image of FIG. 7 by a vessel boundary detector, according to invention principles.

Height and width are the height and width of source image.
G[i][j] is the pixel intensity value at row I and column j
F[x+i][y+j] is the filter matrix entry at row x+I, and column y+j FIG. 8 shows an image provided in response to edge detection performed in an input image shown in FIG. 7 by vessel boundary detector 36.

In step 609, detector 36 enhances edge contrast information with contrast stretching for images (or a portion of an image) with reduced variation of intensity of edges. Detector 36 determines upper and lower pixel value limits over which the image is to be normalized and generates a histogram pixel count for each pixel intensity in the determined intensity range. In one embodiment, the determined intensity range is specified as 0-255, for example. The intensity range on which contrast stretching is to be performed is specified as intensities covering the 14th and 86th percentile of total pixel count, for example.

Figure 9:
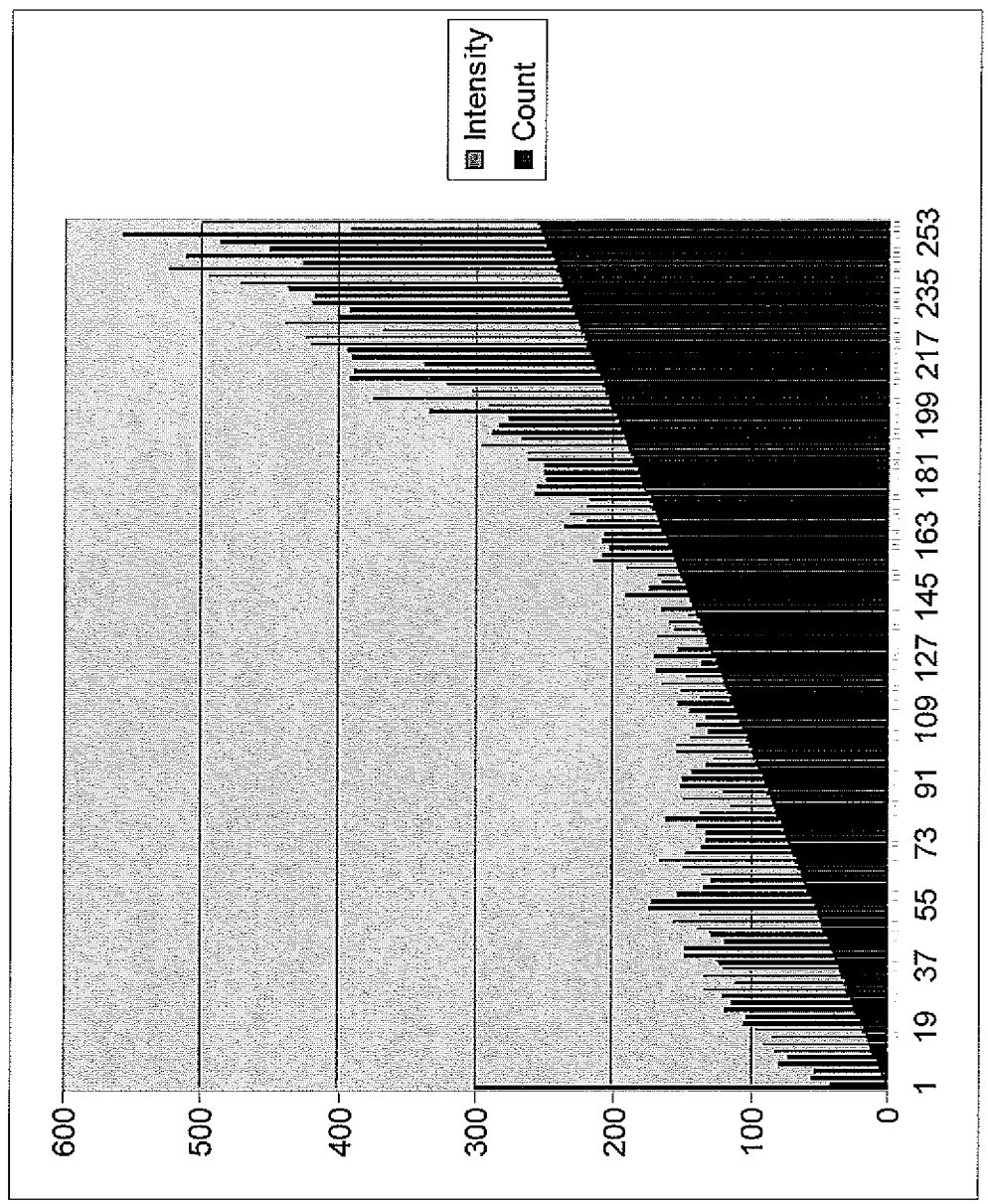
FIG. 9 shows a histogram presenting pixel count versus luminance intensity in an image of limited edge contrast prior to contrast stretching, according to invention principles.

FIG. 9 shows a histogram presenting pixel count versus luminance intensity in an image of limited edge contrast prior to contrast stretching. Detector 36 stretches luminance intensity values of the pixel luminance values of the FIG. 9 image using the function, Pstretch=(Pin−C)(b−a/d−c)+a where, a and b are the lower and upper limit of allowed intensity, i.e. 0 to 255
    c and d are the intensities at 14th and 86th percentile of pixel count
    Pin is input pixel intensity for stretching
    Pstretch is stretched output pixel intensity.

Figure 10:
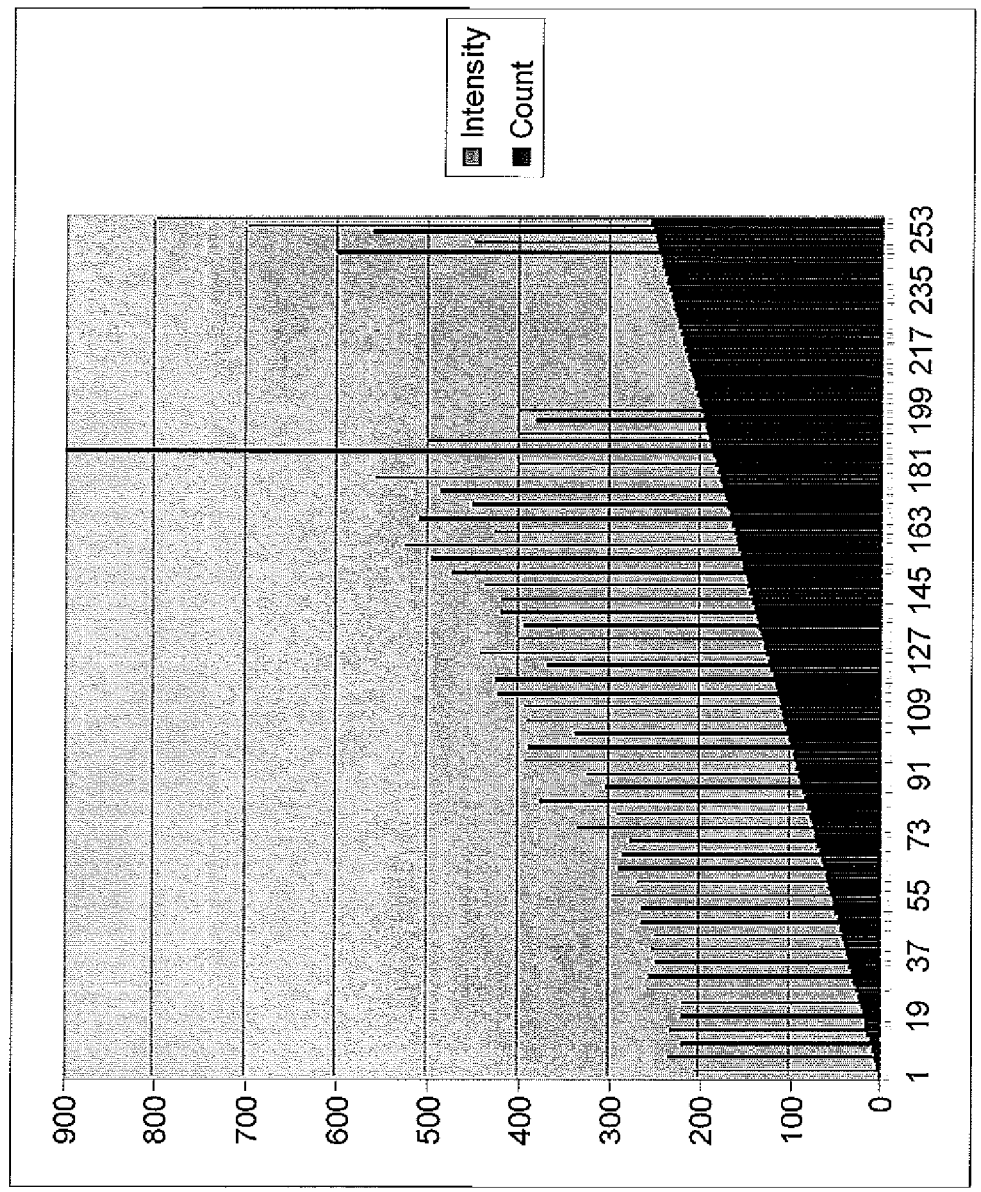
FIG. 10 shows a histogram presenting pixel count versus luminance intensity employed by a vessel boundary detection system following contrast stretching, according to invention principles.
Figure 11:
FIG. 11 shows an image provided in response to processing the input image of FIG. 7 by a vessel boundary detection system using contrast stretching, according to invention principles.

FIG. 10 shows a histogram presenting pixel count versus luminance intensity employed by a vessel boundary detection system following contrast stretching. FIG. 11 shows an image provided in response to processing the input image of FIG. 7 by vessel boundary detector 36 using contrast stretching to perform contrast stretch on edge pixels.

In step 612, detector 36 detects edge pixels and edge pixel direction in the contrast stretched pixel data. Detector 36 detects edge pixel maxima, i.e. pixel luminance gradient transitions above a predetermined threshold value in horizontal and vertical directions for each pixel. Detector 36 also performs convolution of the horizontal and vertical matrix for neighbouring pixels to approximate and filter gradient values of a pixel. The gradient at a point (xi,yi) is calculated by Gradient(xi,yi)=sqrt($Gx^2+Gy^2$), Gx and Gy are the gradient approximations in X and Y direction.

In one embodiment, the convolution matrices for horizontal and vertical approximation are, 1  0  1

−2  0  2

−1  0  1

Convolution matrix for horizontal approximation and 1  2  1

0  0  0

−1 −2 −1

Convolution matrix for vertical gradient approximation.

The gradient approximation values of each pixel in the horizontal and vertical direction are used to determine the edge direction at each pixel location. Detector 36 uses an atan2 function of horizontal and vertical gradients to determine an edge direction at a pixel location. The atan2 function is a variation of the arctangent function and real arguments x and y are not both equal to zero, atan2(y, x) is the angle in radians between the positive x-axis of a plane and the point given by the coordinates (x, y) on it. A measured angulation is approximated to angle values 0°, 45°, 90°, 135° with a downward angle direction with respect to the horizontal axis (x-axis). Table 1 shows the approximation of the pixel direction to 0°, 45°, 90°, 135°.

Ø(i, j)=atan2(Gx,Gy), Gx and Gy are Gradient approximation in X and Y direction.

TABLE 1

Approximation of the pixel direction

| Angle Range | Adjusted angle | Direction to next pixel |
|---|---|---|
| −22.5 < ø < 22.5, 157.5 < ø < −157.5 | 0° | Direction to right horizontally |
| 22.5 < ø < 67.5, −157.5 < ø < −112.5 | 45° | Direction 45° to x axis in downward direction |
| 67.5 < ø < 112.5, −112.5 < ø < −67.5 | 90° | Direction perpendicular to x axis in downward direction |
| 112.5 < ø < 157.5, −67.5 < ø < −22.5 | 135° | Direction 135° to x axis in downward direction |

Figure 12:
FIG. 12 shows an outline of edges of vessels in the image of FIG. 11 determined by a vessel boundary detector, according to invention principles.

In step 615, detector 36 traces edges in the image so that blood vessels in a two dimensional image view appear as two substantially parallel curves which are continuous but change orientation and vessel width. Detector 36 determines an outline of vessel edges with maxima gradient in the image and gradient and pixel direction of each pixel calculated in step 612. Detector 36 traces the edges by including neighbouring edge pixels having substantially the same gradient direction in individual edge segments and by collating edge segments to form a vessel outline of a detected edge in an image. FIG. 12 shows an outline of edges of vessels in the image of FIG. 11 determined by detector 36 having pixel luminance values exceeding a predetermined threshold.

In step 617, detector 36 determines a vessel boundary by performing a curve fit for the detected edge pixel segments and detecting a vessel boundary for each segment of an edge. The vessel boundary pixels are established in one embodiment using a fifth order polynomial curve fit, for example. Detector 36 fits the polynomial to the X and Y co-ordinate values of sequential edge pixels and uses a minimum spanning tree for each edge segment. The fifth order polynomial is, $F(x)=\Sigma(Cj*X^j); 0<=j<=5; F(x)=Y$ i.e. $Y=\Sigma(Cj*X^j)$                     equation (1).

Further, A and Y are matrices of X and Y co-ordinates of the edge pixels respectively. Equation (1) gives AC=Y where matrix C represents a coefficient or a least square residual determined from the input X and Y co-ordinates of equation (1). A transpose of both sides of equation AC=Y, provides equation (2).

$BC = D; B = A * A(t), D = A(t)Y;$         equation (2)

A(t) is transpose of matrix A where Matrix B is

-continued $$\begin{matrix} N & \Sigma(Xi) & \Sigma(Xi^2) & \Sigma(Xi^3) & \Sigma(Xi^4) & \Sigma(Xi^5) \\ \Sigma(Xi) & \Sigma(Xi^2) & \Sigma(Xi^3) & \Sigma(Xi^4) & \Sigma(Xi^5) & \Sigma(Xi^6) \\ \Sigma(Xi^2) & \Sigma(Xi^3) & \Sigma(Xi^4) & \Sigma(Xi^5) & \Sigma(Xi^6) & \Sigma(Xi^7) \\ \Sigma(Xi^3) & \Sigma(Xi^4) & \Sigma(Xi^5) & \Sigma(Xi^6) & \Sigma(Xi^7) & \Sigma(Xi^8) \\ \Sigma(Xi^4) & \Sigma(Xi^5) & \Sigma(Xi^6) & \Sigma(Xi^7) & \Sigma(Xi^8) & \Sigma(Xi^9) \\ \Sigma(Xi^5) & \Sigma(Xi^6) & \Sigma(Xi^7) & \Sigma(Xi^8) & \Sigma(Xi^9) & \Sigma(Xi^{10}) \end{matrix}$$

$N$ = Number of input points for curve fit, $1 <= i <= N$ and Matrix $D$ is $\Sigma(yi)$ $\Sigma(xiyi)$ $\Sigma(xi^2 yi)$ $\Sigma(xi^3 yi)$ $\Sigma(xi^4 yi)$ $\Sigma(xi^5 yi)$.

Figure 13:
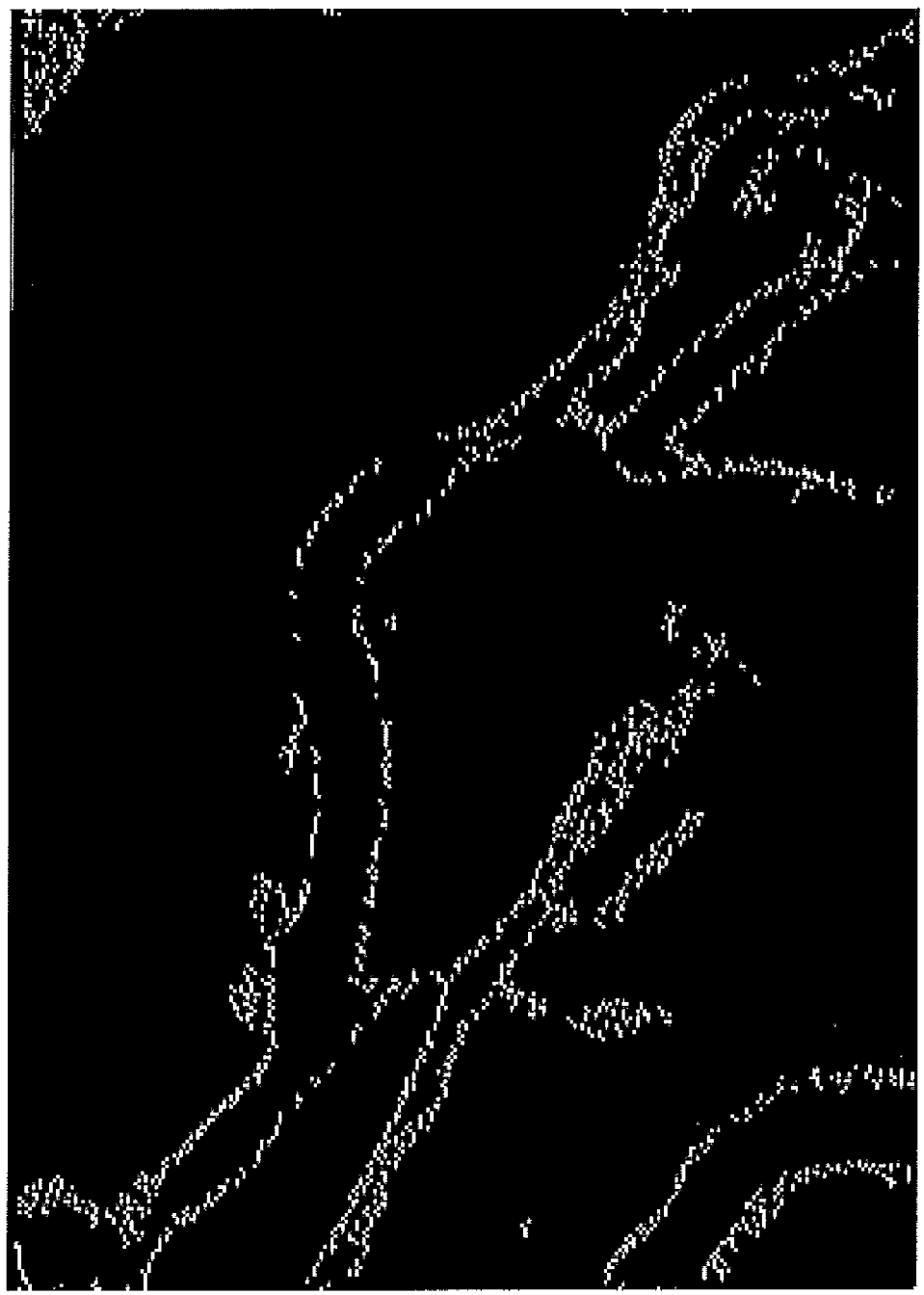
FIG. 13 shows the vessel image of FIG. 12 in response to curve fitting used to determine a vessel boundary outline, according to invention principles.

The coefficient matrix C of equation (1) is obtained by Gaussian elimination with partial pivoting on B|D. A partial pivoting approach is taken in order to avoid a pivot element equal to zero. Substituting Cj and Xi in equation (1), gives the new Yi, $0<=j<=5$, Xi is X co-ordinate at point i. The vessel boundary outline is determined with the curve fit Y co-ordinate for each of the edge pixels. FIG. 13 shows the vessel image of FIG. 12 in response to curve fitting by detector 36 used to determine a vessel boundary outline.

Curve fit pixel values derived in step 617 for the detected edge pixel segments are accumulated in step 620. Steps 617 and 620 are repeated for different segments until it is determined in step 623 that a vessel boundary is detected for the multiple segments of edges of the whole image.

In step 626, detector 36 in response to user command entered via user interface device 31, marks a ROI, marks a vessel, extends the marked vessel and measures a minimal luminal diameter (MLD). Detector 36 tracks a vessel boundary in a ROI and measures the MLD during marking a vessel or extending a marked vessel in a ROI. Detector 36 tracks a vessel boundary in a ROI, in response to the previously performed vessel boundary detection for the whole image and user marking of start and end point in a ROI as previously described in connection with FIG. 14A.

Figure 14B:
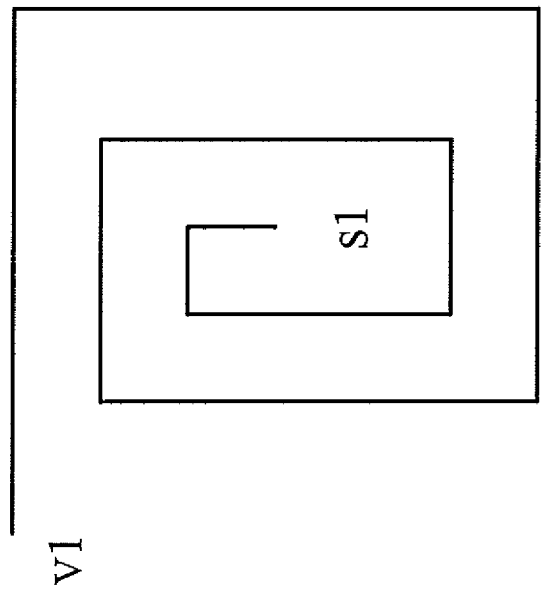
FIG. 14A shows start and end points of a vessel in a ROI and FIG. 14B illustrates determination of a vessel boundary seed point in a ROI by a vessel boundary detection system, according to invention principles.
Figure 14A:
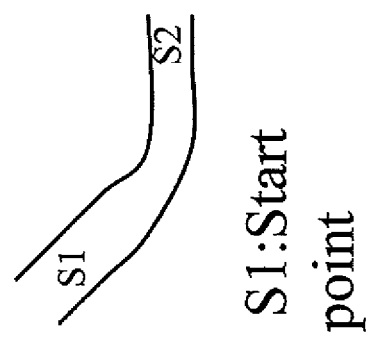
Figure 15A:
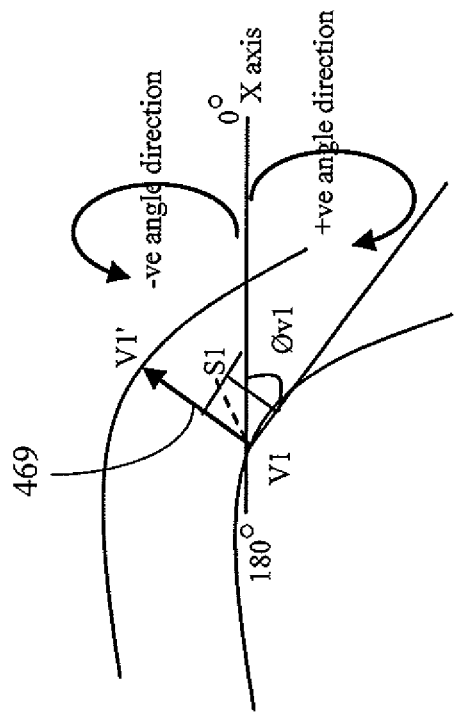
FIGS. 15A and 15B illustrate determining a perpendicular line between vessel boundary points, according to invention principles.
Figure 15B:
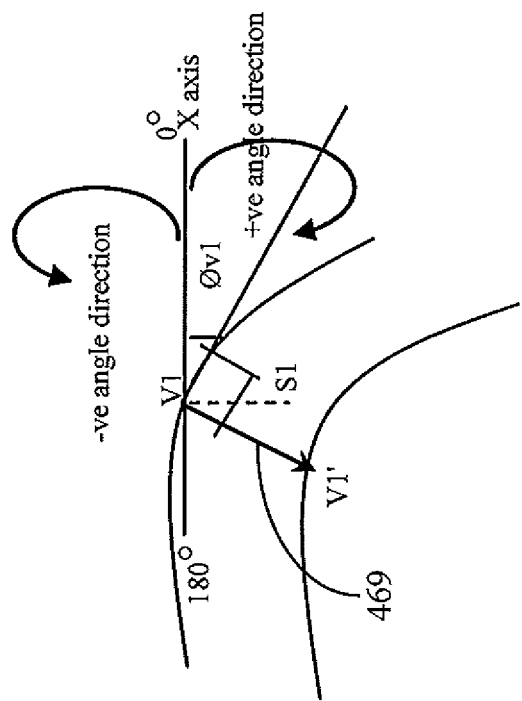

FIG. 14B illustrates determination of a vessel boundary seed point in a ROI by detector 36. Detector 36 initially selects S1 as a seed point and looks for a nearest vessel boundary pixel e.g. following a spiral outward path until pixel V1 is detected. On reaching the boundary pixel detected in step B, a pixel status of V1 is set as marked vessel. In response to determining a starting boundary pixel in one boundary i.e. V1, a pixel at the corresponding opposite boundary of the vessel i.e. VP is marked by tracking in the direction perpendicular to boundary at V1. FIGS. 15A and 15B illustrate determining a perpendicular line between vessel boundary points V1 and V1'. The seed boundary point V1 may be in either of the two boundary edges as illustrated in FIGS. 15A and 15B respectively. Detector 36 traverses in a direction perpendicular to the pixel V1 on the vessel boundary to find angle Øv1 of perpendicular line 469 with respect to the X axis for edge pixels. The direction of the perpendicular line can be upward (decreasing Y axis or row value), downward (increasing Y axis or row value), leftward (decreasing X axis or column value) rightward (increasing X axis or column value). Table 2 shows the calculation of the angle of the perpendicular line with respect to X axis.

TABLE 2

Calculation of the angle of the perpendicular line with respect to X axis

| V1V1' direction | Øv1 | <V1V1' to x axis |
|---|---|---|
| Downward | 0° | (90° + Øv1) = 90° |
|  | 45° | (90° + Øv1) = 135° |
|  | 135° | (90° + Øv1) = 45° |
| Upward | 0° | (Øv1 − 90°) = −90° |
|  | 45° | (Øv1 − 90°) = −45° |
|  | 135° | (Øv1 − 90°) = −135° |
| Leftward | 90° | (90° + Øv1) = 180° |
| Rightward | 90° | (Øv1 − 90°) = 0° |

Figure 16:
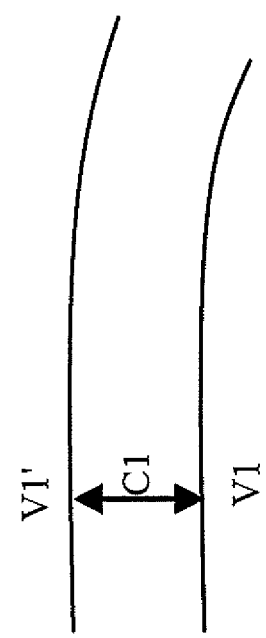
FIG. 16 illustrates calculating a center point of a perpendicular line between vessel boundary points, according to invention principles.

The path in between the pixels V1 and V1' is perpendicular to the vessel boundary and the length of the path is the diameter of vessel at V1 and V1'. Detector 36 marks the seed boundary pixel in the ROI and calculates the diameter of the vessel at V1 and V1' and calculates the center point C1 of the diameter at V1V1'. FIG. 16 illustrates calculating center point C1 of the perpendicular line between vessel boundary points V1 and V1'.

Figure 17:
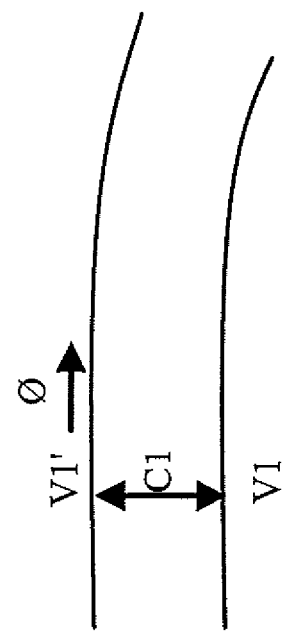
FIG. 17 illustrates finding a next boundary point along a vessel direction, according to invention principles.
Figure 18:
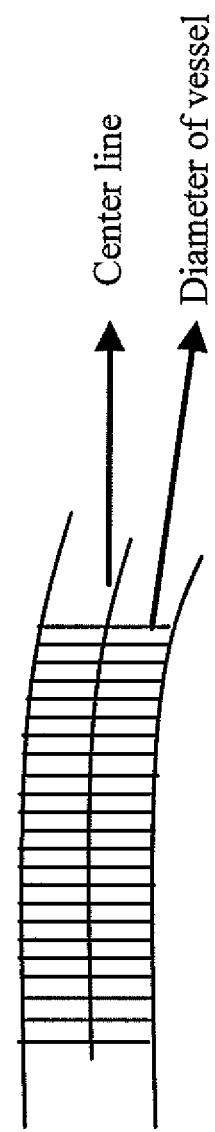
FIG. 18 illustrates a center line and diameter of a vessel in a ROI, according to invention principles.

Upon marking the seed boundary pixel in the ROI and calculation of the diameter and center point of the vessel at the seed point, detector 36 traces along the vessel boundary in the direction of last marked boundary pixel and marks the next boundary pixel. FIG. 17 illustrates finding a next boundary point along a vessel direction. Detector 36 calculates diameter and center point at each location during traversing a vessel boundary. Tracing of the boundary pixels ends on reaching near a user marked end point (e.g., point S2 of FIG. 14A). FIG. 18 illustrates a center line and diameter at each pixel location of a vessel in a ROI. Table 3 shows results of tracing of a vessel boundary in the ROI.

TABLE 3

Boundary pixel and corresponding diameter

| Boundary Pixel | Diameter path | Diameter Length | MLD |
|---|---|---|---|
| V1V1' | V1 ... V1' | L1 |  |
| ... | ... | ... | Lm |
| VnVn' | Vn ... Vn' | Ln |  |

Upon the boundary pixels in the ROI being marked and vessel diameter being calculated along the vessel in the ROI, detector 36 determines the minimal luminal diameter by finding the minimum value of the diameter length column of Table 3. In step 629, the process of FIG. 6 terminates.

System 10 (FIG. 2) accurately detects a vessel boundary and enables a user to mark a ROI on the detected vessel advantageously preventing a user from marking a ROI outside the vessel boundary and resulting mismatch of an incorrectly detected vessel and an actual vessel. System 10 enables a user to extend an already marked vessel boundary in a ROI by marking a new center point facilitating switching vessel detection from a non-bifurcation to a bifurcation in a vessel. The system improves detection for vessels with smaller diameter and uses a polynomial curve fit method for smoothing vessel edges (boundaries) and segmenting curve fit to groups of seven pixels, for example. System 10 further enables reducing the number of pixels used in each curve fit iteration to reduce smooth error and improve vessel boundary detection. The system improves detection in a low contrast image by performing contrast stretch to aid in detection of edge pixels in an image having lower intensity variation between an edge pixel and its neighbouring pixel. In addition system 10 reduces computation time by performing vessel boundary detection of an entire image and storing boundary pixel location and direction for use in subsequent vessel boundary detection in a region of interest selected by a user. The storing and reuse of this pixel information advantageously reduces computation time during marking and extending a vessel.

FIG. 19 shows a flowchart of a process employed by anatomical blood vessel detection and display system 10 (FIG. 2). In step 912 following the start at step 911, a user interface enables a user, via a display of an image generated by display processor 15 presenting anatomical vessels on display 19, to, mark a region of interest of a vessel identified by detected boundaries in the image and extend the marked region of interest of the vessel by extending the marking of the detected boundaries in the direction of a point selected by a user on the vessel into a bifurcation, for example, via the user interface. The marked region of interest of the vessel is extended by, identifying a first pixel on one of the detected boundaries closest to a point selected by a user using the user interface, identifying a second pixel on the other of the detected boundaries closest to the point selected by the user and extending marking of the detected boundaries beyond the marked region of interest by determining vessel boundary pixels in the image adjacent to the first and second pixels. Further, the marked region of interest of the vessel is identified by visual attribute comprising at least one of, (a) highlighting, (b) different color, (c) different shading, (d) different pattern and (e) dashed line.

The user interface in step 915 prevents a user from marking the region of interest outside a vessel boundary based on detected location of the vessel boundary. In step 917 vessel boundary detector 36 automatically detects a boundary of the vessel in the extended marked region of interest by detecting an edge representing a change in luminance in data representing the image. Detector 36 detects the edge representing the change in luminance in response to determining a luminance gradient exceeding a predetermined threshold, Detector 36 detects individual pixels comprising the edge representing the change in luminance in response to determining a luminance gradient exceeding a predetermined threshold and by fitting a curve to individual segmented groups of substantially adjacent pixels. A segmented group of substantially adjacent pixels comprises a predetermined number of pixels. Further, detector 36 automatically identifies vessel boundaries having a luminance variation below a predetermined threshold and enhances the luminance variation using a contrast stretching function employing an enhancement factor derived using a ratio of a maximum luminance intensity range to a predetermined portion of the maximum luminance intensity range. The contrast stretching function comprises, Pstretch=(Pin−C)(b−a/d−c)+a, for example, as previously described.

In step 923, image data processor 29 identifies a minimum vessel diameter in the extended marked region of interest between the detected boundaries and in step 926 identifies the location of the minimum vessel diameter in the image. The process of FIG. 19 terminates at step 933.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 2-19 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system enables a user to mark a ROI of a vessel portion having detected boundaries and extend the automatic detection of vessel boundaries into a region identified by the user. Further, the processes and applications may, in alternative embodiments, be located on one or more (e.g., distributed) processing devices on a network linking the units of FIG. 2. Any of the functions and steps provided in FIGS. 2-19 may be implemented in hardware, software or a combination of both.

What is claimed is:

1. An anatomical blood vessel detection and display system, comprising:
   a user interface enabling a user, via a display of an image presenting anatomical vessels, to,
   mark a region of interest of a vessel identified by detected boundaries in said image and
   extend the marked region of interest of said vessel by extending the marking of the detected boundaries in the direction of a point selected by a user on the vessel into a bifurcation via the user interface, by extending a marked vessel boundary in said region of interest by marking a new center point facilitating switching vessel detection from a non-bifurcation to a bifurcation;
   a detector for automatically detecting a boundary comprising an outline of edges of said vessel in the extended marked region of interest by detecting an edge representing a change in luminance in data representing said image in the extended marked region and in the direction of a point selected by a user in said display image and by tracing the edges by including neighbouring edge pixels having substantially the same direction of edge representative luminance gradient as starting edge pixels; and
   an image data processor for identifying a minimum vessel diameter in the extended marked region of interest between the detected boundaries and for initiating identification of the location of the minimum vessel diameter in said image.

2. A system according to claim 1, wherein
   said starting edge pixels are automatically determined pixels comprising a first pixel in a first boundary and a second pixel in a second boundary of said vessel and
   the marked region of interest of said vessel is automatically extended into a bifurcation by extending the marking of said detected boundaries substantially in the direction of a point selected by a user on said vessel via said user interface.

3. A system according to claim 2, wherein
   the marked region of interest of said vessel is identified by visual attribute comprising at least one of, (a) highlighting, (b) different color, (c) different shading, (d) different pattern and (e) dashed line.

4. A system according to claim 2, wherein
   the marked region of interest of said vessel is automatically extended by,
   identifying a first pixel on one of said detected boundaries closest to a point selected by a user using said user interface,
   identifying a second pixel on the other of said detected boundaries closest to said point selected by said user and
   extending marking of said detected boundaries beyond the marked region of interest into a bifurcation by determining vessel boundary pixels in said image adjacent to the first and second pixels using a curve fitting function.

5. A system according to claim 1, wherein
   said detector automatically identifies vessel boundaries having a luminance variation below a predetermined threshold and enhances said luminance variation by use of an enhancement factor and
   detects a vessel boundary by detecting an edge representing a change in the enhanced luminance variation.

6. A system according to claim 1, wherein
   said detector detects said edge representing said change in luminance in response to determining a luminance gradient exceeding a predetermined threshold.

7. A system according to claim 1, wherein
   said detector automatically identifies vessel boundaries having a luminance variation below a predetermined threshold and enhances said luminance variation using a contrast stretching function employing an enhancement factor derived using a ratio of a maximum luminance intensity range to a predetermined portion of the maximum luminance intensity range.

8. A system according to claim 7, wherein
   said contrast stretching function comprises, $$Pstretch = (Pin - C)(b - a/d - c) + a$$

where, a and b are the lower and upper limit of allowed intensity,
   c and d are the intensities at selected percentiles of pixel count,
   Pin input pixel intensity for stretching and
   Pstretch is stretched output pixel intensity.

9. A system according to claim 1, wherein
   said detector detects individual pixels comprising said edge representing said change in luminance in response to determining a luminance gradient exceeding a predetermined threshold and by fitting a curve to individual segmented groups of substantially adjacent pixels.

10. A system according to claim 9, wherein
    a segmented group of substantially adjacent pixels comprises a predetermined number of pixels.

11. A system according to claim 1, wherein
    said user interface enables a user to extend the marked region of interest of said vessel into a bifurcation comprising a side branch of said vessel.

12. A method for anatomical blood vessel detection and display system, comprising the activities of:
    enabling a user, via a display of an image presenting anatomical vessels, to,
    mark a region of interest of a vessel identified by detected boundaries in said image and
    extend the marked region of interest of said vessel by extending the marking of the detected boundaries in the direction of a point selected by a user on the vessel into a bifurcation via a user interface, by extending a marked vessel boundary in said region of interest by marking a new center point facilitating switching vessel detection from a non-bifurcation to a bifurcation;
    automatically detecting a boundary comprising an outline of edges of said vessel in the extended marked region of interest by detecting an edge representing a change in luminance in data representing said image in the extended marked region and in the direction of a point selected by a user in said display image and by tracing the edges by including neighbouring edge pixels having substantially the same direction of edge representative luminance gradient as starting edge pixels; and
    identifying a minimum vessel diameter in the extended marked region of interest between the detected boundaries and for initiating identification of the location of the minimum vessel diameter in said image.

13. A method according to claim 12, wherein
    said starting edge pixels are automatically determined pixels comprising a first pixel in a first boundary and a second pixel in a second boundary of said vessel and
    the marked region of interest of said vessel is automatically extended by extending the marking of said detected boundaries substantially in the direction of a point selected by a user on said vessel.

14. A method according to claim 13, wherein the marked region of interest of said vessel is identified by visual attribute comprising at least one of, (a) highlighting, (b) different color, (c) different shading, (d) different pattern and (e) dashed line.

15. A method according to claim 13, wherein the marked region of interest of said vessel is automatically extended by,
identifying a first pixel on one of said detected boundaries closest to a point selected by a user,
identifying a second pixel on the other of said detected boundaries closest to said point selected by said user and
extending marking of said detected boundaries beyond the marked region of interest by determining vessel boundary pixels in said image adjacent to the first and second pixels using a curve fitting function.

16. A method according to claim 12, including the activities of
automatically identifying vessel boundaries having a luminance variation below a predetermined threshold and enhances said luminance variation by use of an enhancement factor and
detecting a vessel boundary by detecting an edge representing a change in the enhanced luminance variation.

17. An anatomical blood vessel detection and display system, comprising:
a user interface enabling a user, via a display of an image presenting anatomical vessels, to,
mark a region of interest of a vessel identified by detected boundaries in said image and
extend the marked region of interest of said vessel by extending the marking of the detected boundaries in the direction of a point selected by a user on the vessel into a bifurcation via the user interface, by extending a marked vessel boundary in said region of interest by marking a new center point facilitating switching vessel detection from a non-bifurcation to a bifurcation and preventing a user from marking said region of interest outside a vessel boundary by extending the marking of said detected boundaries in the direction of a point selected by a user on said vessel via said user interface;
a detector for automatically detecting a boundary comprising an outline of edges of said vessel in the extended marked region of interest by detecting an edge representing a change in luminance in data representing said image in the extended marked region and in the direction of a point selected by a user in said display image and by tracing the edges by including neighbouring edge pixels having substantially the same direction of edge representative luminance gradient as starting edge pixels; and
an image data processor for identifying a minimum vessel diameter in the extended marked region of interest between the detected boundaries.

18. A system according to claim 17, wherein
said image data processor identifies the location of the minimum vessel diameter in said image,
the marked region of interest of said vessel is extended by,
identifying first pixels on adjacent detected vessel boundaries and
extending marking of the detected adjacent vessel boundaries by identifying pixels adjacent to said first pixels on the boundaries in the direction of said point selected by said user.

19. A system according to claim 18, wherein
said detector detects individual pixels comprising said edge representing said change in luminance in response to determining a luminance gradient exceeding a predetermined threshold and by fitting a curve to individual segmented groups of substantially adjacent pixels.

20. A system according to claim 17, wherein
the marked region of interest of said vessel is identified by visual attribute comprising at least one of, (a) highlighting, (b) different color, (c) different shading, (d) different pattern and (e) dashed line,
said detector automatically identifies vessel boundaries having a luminance variation below a predetermined threshold and enhances said luminance variation by use of an enhancement factor and
detects a vessel boundary by detecting an edge representing a change in the enhanced luminance variation.

21. A system according to claim 17, wherein
said detector detects said edge representing said change in luminance in response to determining a luminance gradient exceeding a predetermined threshold.

22. A system according to claim 17, wherein
said user interface enables a user to extend the marked region of interest of said vessel into a bifurcation comprising a side branch of said vessel.

* * * * *